United States Patent
Staines et al.

(10) Patent No.: US 9,834,160 B2
(45) Date of Patent: Dec. 5, 2017

(54) STRUCTURAL MEMBER

(71) Applicant: FORD GLOBAL TECHNOLOGIES, LLC, Dearborn, MI (US)

(72) Inventors: Bradley Staines, Bishops Stortford (GB); Steven Busby, Zurich (CH)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/359,760

(22) Filed: Nov. 23, 2016

(65) Prior Publication Data
US 2017/0151921 A1    Jun. 1, 2017

(30) Foreign Application Priority Data

Nov. 27, 2015 (GB) .................................. 1520996.8

(51) Int. Cl.
*B60R 19/34* (2006.01)
*B62D 21/15* (2006.01)
*B21D 39/02* (2006.01)
*B21D 53/88* (2006.01)
*B60R 19/02* (2006.01)

(52) U.S. Cl.
CPC ............ *B60R 19/34* (2013.01); *B21D 39/026* (2013.01); *B21D 53/88* (2013.01); *B60R 19/023* (2013.01); *B62D 21/152* (2013.01); *B60Y 2306/01* (2013.01)

(58) Field of Classification Search
CPC ..... B60R 19/34; B60R 19/023; B21D 39/026; B21D 53/88; B60Y 2306/01
USPC ............... 296/187.09, 203.02; 293/132, 133; 188/377
See application file for complete search history.

(56) References Cited

U.S. PATENT DOCUMENTS

| | | | | |
|---|---|---|---|---|
| 4,431,221 A | * | 2/1984 | Jahnle | ..................... B60R 19/18 188/377 |
| 4,684,151 A | * | 8/1987 | Drewek | ............... B62D 21/152 280/784 |
| 5,118,160 A | * | 6/1992 | Kitagawa | ............. B62D 21/152 296/187.03 |
| 5,246,263 A | * | 9/1993 | Tanaka | ................. B62D 21/152 296/187.11 |

(Continued)

FOREIGN PATENT DOCUMENTS

DE     102004002948 A1    8/2005
GB          1228088       4/1971

(Continued)

OTHER PUBLICATIONS

Intellectual Property Office, Combined Search and Examination Report, Application No. GB1520996.8, Apr. 28, 2016, 8 pages.
European Search Report, EP Application No. 16194656.

*Primary Examiner* — Jason S Morrow
*Assistant Examiner* — E Turner Hicks
(74) *Attorney, Agent, or Firm* — Jason Rogers; Brooks Kushman P.C.

(57) ABSTRACT

A crash structure for a vehicle includes a crash can having a plurality of indents and a support rail aligned longitudinally with the crash can. The support rail has an inboard surface region having a further indent to facilitate inward deformation of the crash structure, and an opposite surface region having a continuous surface opposite the further indent. A method of manufacturing a crash structure is also provided.

19 Claims, 4 Drawing Sheets

(56) References Cited

U.S. PATENT DOCUMENTS

| | | | | |
|---|---|---|---|---|
| 5,853,195 A | * | 12/1998 | Le ..................... | B62D 21/152 |
| | | | | 188/377 |
| 6,003,934 A | * | 12/1999 | Usui .................. | B62D 21/152 |
| | | | | 296/187.09 |
| 6,439,650 B2 | * | 8/2002 | Artner ................ | B62D 21/152 |
| | | | | 293/102 |
| 6,588,830 B1 | * | 7/2003 | Schmidt .............. | B60R 19/34 |
| | | | | 180/311 |
| 7,341,299 B1 | * | 3/2008 | Baccouche ......... | B62D 21/152 |
| | | | | 296/203.02 |
| 7,389,860 B2 | * | 6/2008 | Abu-Odeh ........... | B62D 21/15 |
| | | | | 188/376 |
| 8,376,427 B2 | * | 2/2013 | Perarnau | |
| | | | Ramos ............... | B21C 37/0815 |
| | | | | 293/132 |
| 2011/0012389 A1 | | 1/2011 | Kanaya et al. | |
| 2015/0232050 A1 | * | 8/2015 | Yamada ............... | B60R 19/34 |
| | | | | 296/187.1 |

FOREIGN PATENT DOCUMENTS

| | | |
|---|---|---|
| GB | 1507218 | 4/1978 |
| GB | 2494251 | 3/2013 |
| JP | 2006347265 A | 12/2006 |

* cited by examiner

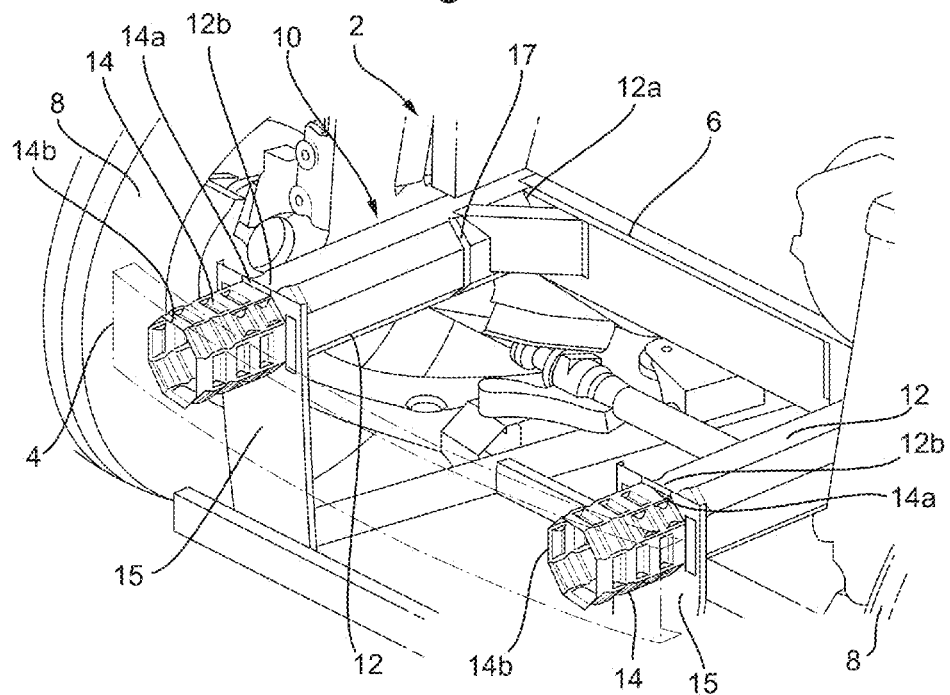
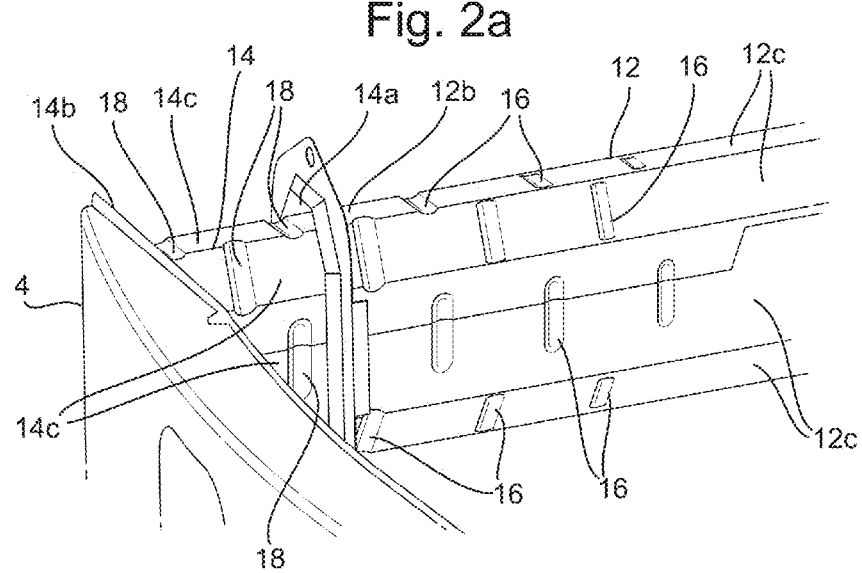

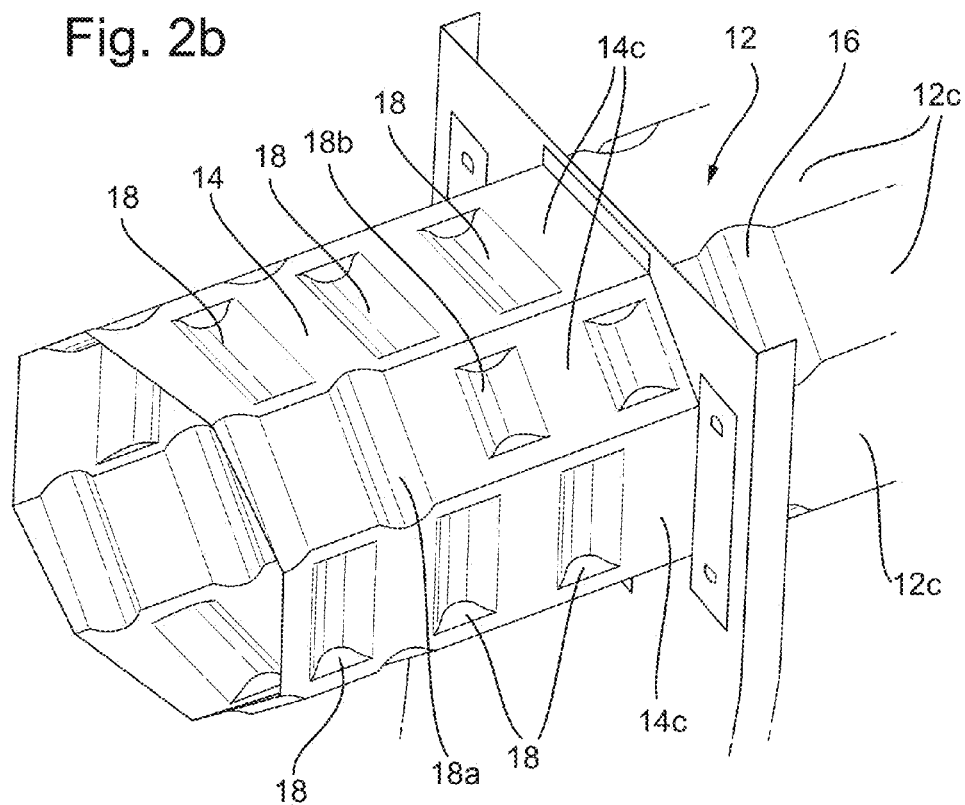
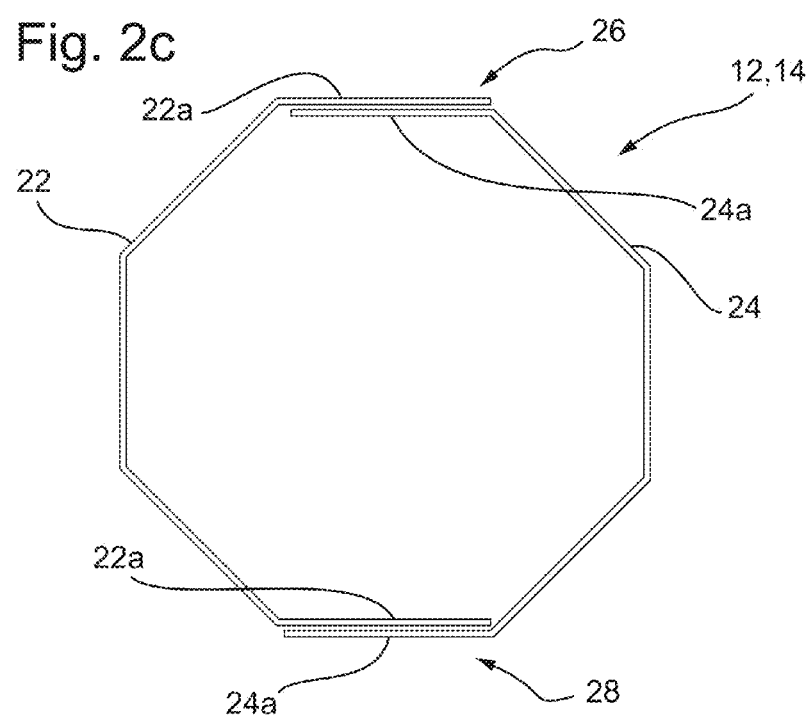

STRUCTURAL MEMBER

CROSS-REFERENCE TO RELATED APPLICATIONS

This application claims foreign priority benefits under 35 U.S.C. §119(a)-(d) to GB 1520996.8 filed Nov. 27, 2015, which is hereby incorporated by reference in its entirety.

TECHNICAL FIELD

The present disclosure relates to a structural member for absorbing energy in a motor vehicle crash.

BACKGROUND

Vehicles, such as motor vehicles, often include one or more crash structures configured to sacrificially deform in the case of a collision to prevent injury to vehicle occupants and/or damage to other components of a vehicle. Crash structures are often configured to dissipate as much energy as possible during their deformation. It is often desirable to minimize the deceleration of the vehicle during a collision, by minimizing the peak force experienced during deformation of the crash structure.

Many vehicles comprise an internal combustion engine, which is often provided towards the front of the vehicle. In the case of the vehicle colliding front on with an obstacle, the engine may collide with the obstacle before the crash structure has fully deformed. The momentum of the engine may represent a significant proportion of the momentum of the vehicle and hence, an impact between the engine and the obstacle may greatly reduce the momentum of the vehicle.

In vehicles with rear mounted engines, the momentum of the engine contributes to the total momentum of the vehicle throughout the full duration of a front on collision. Providing a crash structure for a vehicle with a rear mounted engine can therefore be challenging.

SUMMARY

According to a first approach, there is provided a structural member for a front of a motor vehicle, the structural member being configured to extend in a longitudinal direction of the vehicle, wherein the structural member has a polygonal cross-sectional shape, the longitudinal projection of which defines a plurality of surfaces, wherein at least one of the surfaces has a plurality of indents provided on the surface, the indents being spaced apart from one another in the longitudinal direction, wherein a first indent on the at least one surface is larger in size than a second indent on the at least one surface, the second indent being further from the front of the vehicle than the first indent. For example, the indents may successively decrease in size from the front of the vehicle. The indents may encourage the successive collapse of the structural member during a collision event.

The indents may have a depth relative to the surrounding surface. The depth of the first indent may be greater than the depth of the second indent.

The indents may have a width extending in a direction perpendicular to the longitudinal direction of the vehicle. The width of the first indent may be greater than the width of the second indent.

One or more of the indents on the at least one surface may extend over part of the width of the surface. Alternatively or additionally, one or more of the indents on the at least one surface may extend over the entire width of the surface. For example, a particular surface may comprise indents extending over part of the surface width and indents that extend over entire surface width.

The indents on a first surface may be longitudinally interspersed with indents from a second, e.g. neighboring, surface.

Each surface may have a plurality of indents provided thereon. Alternatively, alternate surfaces may have a plurality of indents provided thereon. Corresponding indents may be provided on opposite surfaces of the structural member.

A further indent may be provided on an inboard side of the structural member. A corresponding indent may not be provided on an opposite outboard side of the structural member. The further indent may extend across one or more of the surfaces. The further indent may be provided near an end of the structural member that is furthest from the front of the vehicle.

The structural member may form a support rail, e.g. forming a sub-frame of the vehicle. Additionally or alternatively, the structural member may form a crash can provided between a support rail and bumper of the vehicle.

The structural member may have a substantially constant, e.g. constant, cross-sectional size and/or shape. The structural member may be tubular, e.g. hollow. The structural member may have a square, hexagonal or octagonal cross-sectional shape. The surfaces may be formed by walls defining edges of the cross-sectional shape.

A vehicle may comprise a first pair of structural members as mentioned above. The first pair of structural members may be laterally spaced apart from one another. The first pair of structural members may be support rails forming a sub-frame of the vehicle or crash cans provided between a support rail and bumper of the vehicle.

The vehicle may further comprise a second pair of structural members as described above. The second pair of structural members may be laterally spaced apart from one another. The second pair of structural members may be coupled to respective structural members of the first pair. The second pair of structural members may be the other of support rails forming a sub-frame of the vehicle or crash cans provided between a support rail and bumper of the vehicle.

The structural members may be provided inboard of wheel arches of the vehicle.

The structural members may be provided at the front of the vehicle. A powertrain, e.g. engine, transmission and/or motor, of the vehicle may be provided at a rear of the vehicle.

In another approach, a method of manufacturing a structural member for a front of a motor vehicle is provided, the structural member being configured to extend in a longitudinal direction of the vehicle. The method includes:

folding and joining one or more sheets of material to form a polygonal cross-sectional shape, the longitudinal projection of which defines a plurality of surfaces; and forming a plurality of indents on at least one of the surfaces, the indents being spaced apart from one another in the longitudinal direction, wherein a first indent on the at least one surface is larger in size than a second indent on the at least one surface, the second indent being further from the front of the vehicle than the first indent, e.g. such that the indents encourage the successive collapse of the structural member during a collision event.

The method may further comprise folding two or more sheets of material to form respective portions of the polygonal cross-sectional shape. The method may further comprise joining the two or more sheets together.

The method may further comprise placing the structural member in a mandrel. The method may further comprise stamping or striking the structural member to form the indents.

In another approach, a crash structure for a vehicle includes a crash can having a plurality of indents and a support rail aligned longitudinally with the crash can. The support rail has an inboard surface region having a further indent to facilitate inward deformation of the crash structure, and an opposite surface region having a continuous surface opposite the further indent.

The plurality of indents may include a first indent and a second indent spaced from the first indent in a longitudinal direction. In some approaches, the first indent extends over an entire width of a planar face, and the second indent extends over less than the entire width of the planar face. In other approaches, a depth of the first indent is greater than a depth of the second indent. In still other approaches, a width of the first indent is greater than a width of the second indent. In still other approaches, the first indent and the second indent are disposed on a first planar surface, and the plurality of indents further includes a third indent disposed on a second planar surface angularly offset with respect to the first planar surface. The third indent may be longitudinally interspersed between the first indent and the second indent.

The crash can may be disposed between the support rail and a bumper of the vehicle. The support rail may be disposed between the crash can and a cross member of the vehicle. A joint plate disposed between the crash can and the support rail.

At least one of the crash can and the support rail may have a hexagonal or octagonal cross-sectional shape. At least one of the crash can and the support rail may be formed from two or more discrete plates.

In some approaches, the plurality of indents is a first plurality of indents. The crash structure may include a second plurality of indents provided on opposite surfaces of the crash structure form the first plurality of indents, the second plurality of indents corresponding to the first plurality of indents. Indents of the second plurality of indents may have an indent dimension corresponding to indent dimensions of the first plurality of indents. The second plurality of indents may have a longitudinal spacing corresponding to a longitudinal spacing of the first plurality of indents.

In another approach, a crash structure for a vehicle includes a polygonal beam including a first planar surface having a first plurality of indents spaced apart by continuous regions of the first planar surface, and a second planar surface adjacent to and angularly offset from the first planar surface. The second planar surface may have a second plurality of indents adjacent to the continuous regions of the first planar surface and longitudinally offset from the first plurality of indents.

In some approaches, the first plurality of indents includes a first indent that extends over an entire width of the first planar surface and a second indent extends over less than the entire width of the first planar surface. The crash structure may further include an inboard surface region having a further indent to facilitate inward deformation of the crash structure, and an opposite surface region having a continuous surface opposite the further indent.

In another approach, a method of manufacturing a crash structure for a front of a vehicle includes folding and joining one or more sheets of material to form a substantially constant polygonal cross-sectional shape. A longitudinal projection of which defines a plurality of surfaces. The method further includes forming a plurality of indents on at least one of the surfaces, the indents being spaced apart from one another in the longitudinal direction. The method further includes forming a further indent on an inboard side of the crash structure, wherein an opposite outboard side of the crash structure is a continuous surface not provided with a corresponding further indent.

In some approaches, the method further includes forming a first indent on the at least one surface and forming a second indent on the at least one surface. The second indent may be smaller in size than the first indent, and may be further from the front of the vehicle than the first indent such that the first and second indents encourage successive collapse of the crash structure during a collision event.

BRIEF DESCRIPTION OF THE DRAWINGS

FIG. 1 shows a crash structure for a vehicle in an undeformed condition;

FIG. 2a shows a crash can and support rail of the crash structure in an undeformed condition;

FIG. 2b shows a crash can and support rail of the crash structure in an undeformed condition;

FIG. 2c is a cross-sectional view of a crash can or support rail of the crash structure in an undeformed condition;

DETAILED DESCRIPTION

Figure 3:
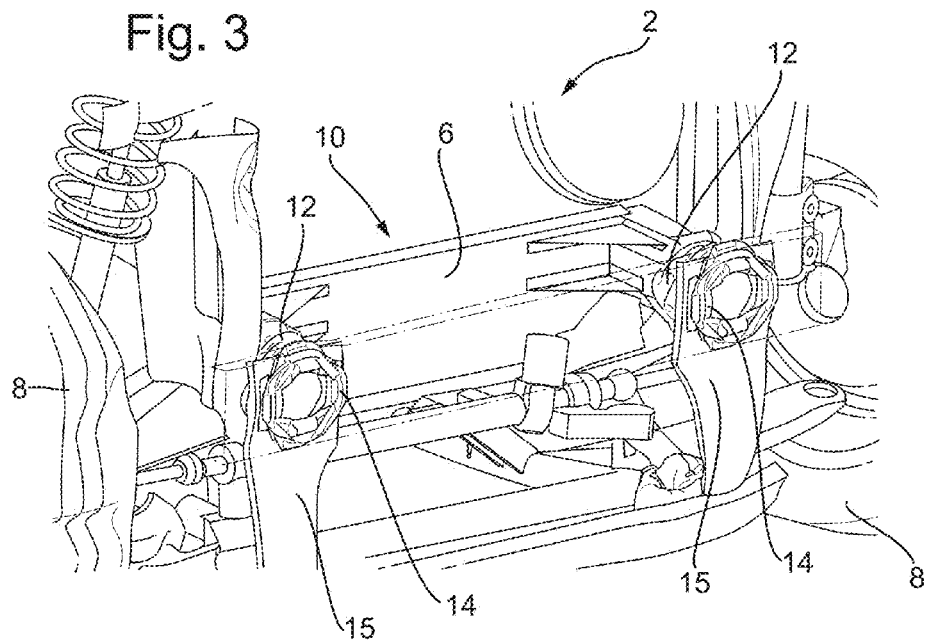
FIG. 3 shows the crash structure for the vehicle following a full frontal collision.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

With reference to FIG. 1, a vehicle, such as a motor vehicle 2, may comprise a front bumper 4 supported by a crash structure 10. The crash structure may be coupled to a cross member 6 of the vehicle. The vehicle may also comprise a plurality of wheels 8 configured to drive the vehicle.

The crash structure 10 may comprises one or more structural members, such as one or more crash cans 14 and/or one or more support rails 12. As depicted in FIG. 1, a pair of support rails 12 is provided and each support rail 12 may be coupled at a first end 12a of the support rail to the cross member 6. The support rails 12 may extend away from the cross member 6. The support rails 12 may extend in a longitudinal direction of the vehicle. For example, as shown in FIG. 1, the support rails may extend from the cross member 6 towards the front of the vehicle, e.g. towards the front bumper 4.

A second end 12b of each of the support rails may be coupled to a first end 14a of a respective crash cans 14. As shown in FIG. 1, the support rails 12 and/or the crash cans 14 may comprise one of more flanges configured to allow the crash cans 14 and the support rails 12 to be coupled using mechanical fasteners, such as bolts or rivets. Additionally or alternatively, the support rails 12 may be coupled to the crash cans 14 using any other method, such as welding or brazing or using an adhesive. However, it may be desirable to use a temporary fastening method to couple the support rail 12 to the crash can 14 to allow the crash can to be replaced if necessary.

A joint plate 15 may be provided at the interface between the second end 12b of each the support rails 12 and the first end 14a of each of the crash cans 14. The joint plate 15 may be coupled to the support rail and the crash can at their interface. Alternatively, the joint plate 15 may be omitted. As shown in FIG. 1, each of the crash cans 14 may be axially aligned, e.g. on a longitudinal axis, with the support rail 12 to which they are coupled. Alternatively, the crash cans 14 may not be aligned with the support rails 14. For example the crash cans may be laterally or vertically offset from the support rails.

A second end 14b of each of the crash cans 14 may be coupled to the front bumper 4. The front bumper 4 may be configured to receive a load from an obstacle (not shown) during a collision of the vehicle with the obstacle, and transfer the load to the crash structure 10. The front bumper 4 may be configured to receive substantially all of the load applied to the vehicle during a front on collision.

As shown in FIG. 1, the structural members 14, 12 of the crash structure may be provided between the wheels 8 of the vehicle 2, e.g. inboard of each of the wheels. The structural members 14, 12 may be provided inboard of wheel arches of the vehicle (not shown), which may be formed in one or more body panels of the vehicle. The arrangement of the structural members 14, 12 of the crash structure 10 shown in FIG. 1 may be possible when the powertrain of the vehicle, e.g. an engine and/or motor and transmission (not shown), is not provided at the front of the vehicle. For example, the powertrain may be provided at a rear of the vehicle and/or at one or more wheels 8 of the vehicle.

With reference the FIGS. 2a, 2b and 2c the structural members 14, 12 may have a substantially constant cross-sectional shape. For example, as shown in FIG. 2c, the structural members may have a substantially constant octagonal shape in cross-section. However, it is equally envisaged that the structural member may have a square, hexagonal or any other polygonal shape in cross-section. In another approach (not shown) the size, e.g. area, of the cross-section may vary from one end of the structural member to the other. For example, the structural members 14, 12 may be tapered.

The cross-sections of the crash cans 14 and the supports rails 12 may be the same shape. Alternatively, the cross-section of the crash cans 14 may be a different shape from the cross-section of the support rails 12.

As shown in FIGS. 2a and 2b, one or more surfaces 12c, 14c may be defined by the longitudinal projection of the cross-section of the structural member 14, 12. At least one of the surfaces 12c, 14c, may comprise one or more indents 16, 18. As depicted in FIGS. 2a and 2b, each of the surfaces 12c, 14c may comprise one or more indents 18. The indents 16, 18 may be spaced apart from each other, e.g. longitudinally, along the support member.

The indents 16, 18 may extend at least partially across a width of one or more surfaces 12c, 14c of the structural member, e.g. in a direction perpendicular to the longitudinal direction of the vehicle. One or more of the indents may extend over substantially the entire width of the surface 12c, 14c. In other words, the indents 16, 18 may have a width (measured in the direction perpendicular to the longitudinal direction of the vehicle), which is less than or equal to the width of the surface 12c, 14c in which they are formed.

The indents 16, 18 may have a depth relative to the surrounding surface 12c, 14c. The indents may be rounded and/or comprise rounded bottoms, e.g. a cross-section of the indents in a plane parallel to the longitudinal direction of the vehicle may be substantially semi-circular or comprise a sector of a circle or ellipse. Alternatively, the cross-section of the indent 16, 18 may be any other shape, such as substantially triangular or substantially square.

As shown in FIGS. 2a and 2b, the indents 16, 18 may be provided on each of the surfaces 12c, 14c of the crash can 14 and the support rail 12. Each surface may comprise a plurality of indents. The indents 16, 18 formed in opposite surfaces of the support members may correspond. For example, the indents 16, 18 in opposite surfaces may be the same width and/or depth and/or may be provided at the same longitudinal locations. In contrast, the indents 16, 18 formed in adjacent, e.g. neighbouring, surfaces may be dissimilar. Indents 16, 18 on one or more surfaces may have a different width and/or depth and/or may be provided at different longitudinal locations to those provided on one or more adjacent surface. For example, indents provided on one or more surfaces 12c, 14c may be longitudinally interspersed with the indents provided on one or more adjacent surfaces.

As shown in FIGS. 2a and 2b, the size, e.g. the depth, span and/or width of the indents 16, 18 provided on the surfaces 12c, 14c may vary along the length, e.g. longitudinal length, of the surfaces 12c, 14c (the indent span may be measured in the longitudinal direction of the vehicle). The size, e.g. depth, span and/or width, of successive indents may decrease from the front of the crash structure 10 towards the rear of the crash structure 10. For example, a first indent 18a provided towards the front of the vehicle 2, e.g. towards a second end 12b of the crash can, may have a greater depth than a second indent 18b provided towards the first end 12a of the crash can, e.g. further from the front of the vehicle 2. Additionally or alternatively, the first indent 18a may have a greater width and/or span than the second indent 18b. In some embodiments, two or more of the indents 16, 18 spaced apart along one of the surfaces 12c, 14c may be grouped into pairs, threes or larger groups, which may be the same size as the others in the group.

With reference to FIG. 2c, the structural members 12, 14 may be formed from one or more folded sheets 22, 24, which may be joined at or near their ends to provide the structural member. As shown in FIG. 2c, the structural member may be formed from two folded sheets, however it is equally envisaged that one or more than two folded sheets may be used to form the structural member.

As depicted in FIG. 2c, the structural member 12, 14 may be formed from a first side sheet 22 and a second side sheet 24. The first and second side sheets 22, 24 may be substantially the same size and/or shape. In order to join the first and second side sheets, one or more end surfaces 22a, 24a at each end of one of the side sheets 22, 24 may be overlapped with one or more end surfaces 22a, 24a provided at each end of the other of the side sheets to form first and second joints 26, 28. The side sheets may be joined at the joints 26, 28 using any appropriate method. For example the first and second side sheets may be bolted, riveted, welded and/or brazed together.

As each of the side sheets may be the same size, the side sheets 22, 24 may be vertically or laterally offset, such that the at one of the joints the end surfaces 22a of the first side sheet 22 are provided on the outside of the structural member 12, 14 and at the other of the joints, the end surfaces 22a of the first side sheet 22 are provided on an inside of the structural member 12, 14. In an alternative embodiment (not shown), the first and second side sheets may be different sizes and the end surfaces of one of the side sheets may be provided on the outside of the structural member 12, 14 at each of the joints.

Figure 5:
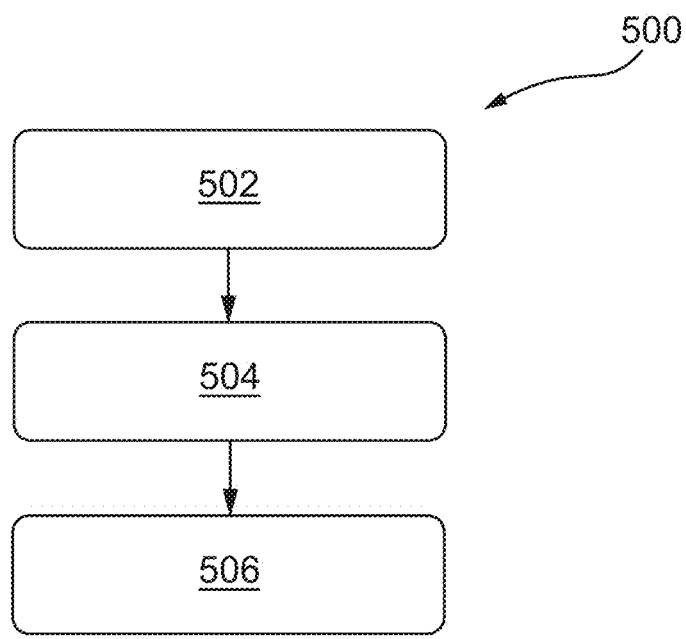
FIG. 5 shows a method for manufacturing a structural member.

With reference to FIG. 5, a method 500 of manufacturing a structure member will now be described. The method 500 comprises a first step 502 in which one or more sheets of material are folded and a second step 504 in which the folded sheet are joined (at their ends), e.g. as described above with reference to FIG. 2c, to form a substantially constant polygonal cross-sectional shape, the longitudinal projection of which defines a plurality of surfaces.

The method 500 further comprises a third step 506, in which a plurality of indents are formed on at least one of the surfaces of the structural member. As described above with reference to FIGS. 2a and 2b, the indents may vary in size, e.g. depth, span and/or width along the length of the structural member. The indents may be produced using a pressing, forming or forging process. The indents may be formed by striking the structural member with a tool configured to provide the desired, shape, depth, span and/or width of indent.

Figure 4:
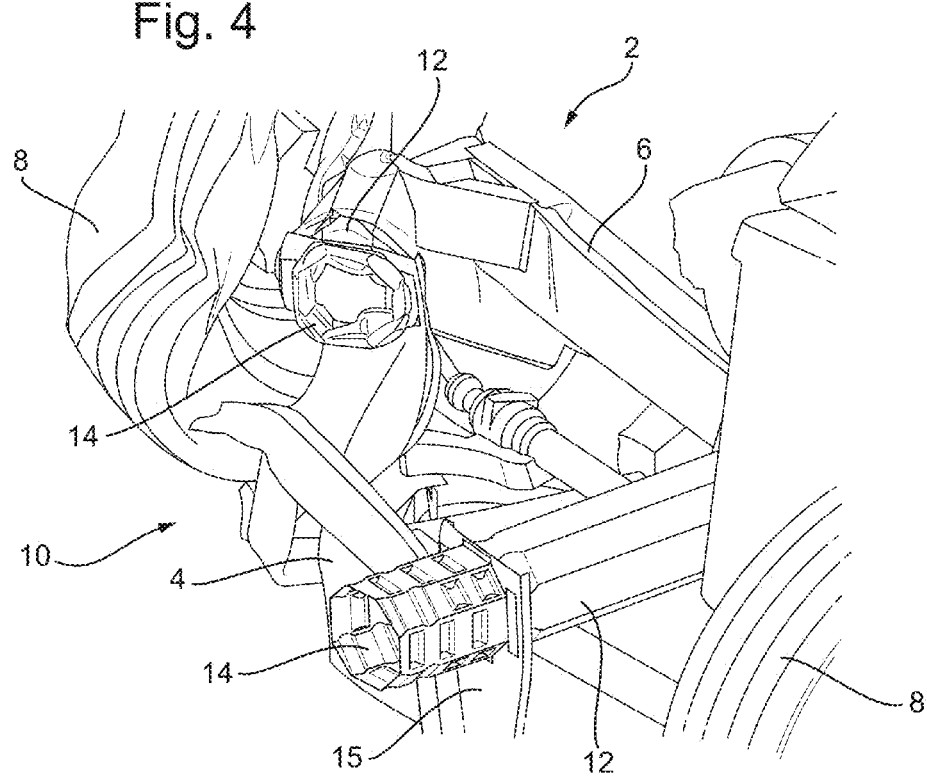
FIG. 4 shows the crash structure for the vehicle following a collision with a laterally offset obstacle.

With reference to FIGS. 3 and 4, when the vehicle 2 is involved in a collision with an obstacle (not shown) the structural members 12, 14 may be configured to collapse in order to dissipate the kinetic energy lost by the vehicles 2 and/or the obstacle during the collision. For example, the surfaces 12a, 14a of the structural members may be configured to buckle locally and fold in order to dissipate energy.

By providing the indents 16, 18 such that the size, e.g. depth, span and/or width, of the indents varies along the longitudinal length of the structural member, the indents may encourage the structural member to collapse in a successive manner during an impact between the vehicle 2 and the obstacle. For example, the indents 18 in the crash can 14 may be configured such that the crash can 14 initially begins to collapse at or towards the second end 14b of the crash can. The collapse of the crash can 14 may propagate towards the first end 14a, e.g. such that the crash can 14 collapses successively from the front of the vehicle 2 rearwards. The indents 16, provided in the support rail 12 may be configured such that, once the crash can 14 has substantially completely collapsed, the support rail 12 begins to collapse at or towards the second end 12b of the support rail 12. Similar to the crash can 14, the indents 16 in the support rail 12 may be configured to encourage the successive collapse of the support rail 12 from the second end 12b towards the first end 12a.

Encouraging successive collapse of the structural members 12, 14, as described above, may lead to more complete collapse of the structural members such that a greater amount of energy may be dissipated by the crash structure 10.

As shown in FIG. 1, the support rail 12 may be provided with a further indent 17. The further indent 17 may be provided on an inboard side of the support rail 12 at or towards the first end 12a of the support rail. The further indent may extend at least partially over the width of the surface 12c. As shown in FIG. 1, the further indent may extend over one or more surfaces 12c of the support rail. The further indent 17 may be configured to affect the direction in which the support rail collapses during a side or offset impact with an obstacle (not shown). FIG. 4 depicts the crash structure 10 following an impact with an offset obstacle. As shown in FIG. 4, the further indent 17 has been configured to encourage the support rail to collapse inwards (relative to the vehicle 2) during the collision. The inwards collapsing of the support rail 12 may increase the energy dissipated by the collapsing of the crash structure 10 and/or may reduce the deceleration of the vehicle 2 during the collision. As the further indent 17 is configured to encourage the support rail 12 to collapse inwards during the collision, a corresponding indent may not be provided on an opposite outboard side of the support rail.

It will be appreciated by those skilled in the art that although the claimed subject matter has been described by way of example, with reference to one or more examples, it is not limited to the disclosed examples and alternative examples may be constructed without departing from the scope of the appended claims.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments not explicitly illustrated or described.

What is claimed is:

1. A crash structure for a vehicle, comprising:
   a crash can having a plurality of indents; and
   a support rail aligned longitudinally with the crash can, the support rail having an inboard surface and an outboard surface within a lateral plane disposed orthogonal to a longitudinal axis of the support rail, the inboard surface defining a further indent at the lateral plane and the outboard surface being substantially free of an indent at the lateral plane.

2. The crash structure of claim 1, wherein the plurality of indents includes a first indent and a second indent spaced from the first indent in a longitudinal direction.

3. The crash structure of claim 2, wherein the first indent extends over an entire width of a planar face, and wherein the second indent extends over less than the entire width of the planar face.

4. The crash structure of claim 2, wherein a depth of the first indent is greater than a depth of the second indent.

5. The crash structure of claim 2, wherein a width of the first indent is greater than a width of the second indent.

6. The crash structure of claim 2, wherein the first indent and the second indent are disposed on a first planar surface, and wherein the plurality of indents further includes a third indent disposed on a second planar surface angularly offset with respect to the first planar surface.

7. The crash structure of claim 6, wherein the third indent is longitudinally interspersed between the first indent and the second indent.

8. The crash structure of claim 1, wherein the crash can is disposed between the support rail and a bumper of the vehicle.

9. The crash structure of claim 1, wherein the support rail is disposed between the crash can and a cross member of the vehicle.

10. The crash structure of claim 1, further comprising a joint plate disposed between the crash can and the support rail.

11. The crash structure of claim 1, wherein at least one of the crash can and the support rail has a hexagonal or octagonal cross-sectional shape.

12. The crash structure of claim 1, wherein at least one of the crash can and the support rail is formed from two or more discrete plates.

13. The crash structure of claim 1, wherein the plurality of indents is a first plurality of indents, the crash structure further comprising a second plurality of indents provided on opposite surfaces of the crash structure form the first plurality of indents, the second plurality of indents corresponding to the first plurality of indents.

14. The crash structure of claim 13, wherein indents of the second plurality of indents have an indent dimension corresponding to indent dimensions of the first plurality of indents.

15. The crash structure of claim 13, wherein the second plurality of indents have a longitudinal spacing corresponding to a longitudinal spacing of the first plurality of indents.

16. A crash structure for a vehicle, comprising:
a polygonal beam including a first planar surface having a first plurality of indents spaced apart by continuous regions of the first planar surface, and a second planar surface adjacent to and angularly offset from the first planar surface, the second planar surface having a second plurality of indents adjacent to the continuous regions of the first planar surface and longitudinally offset from the first plurality of indents; and
a support rail aligned longitudinally with the polygonal beam, the support rail having an inboard surface and an outboard surface within a lateral plane disposed orthogonal to a longitudinal axis of the support rail, the inboard surface defining a further indent at the lateral plane to facilitate inward deformation of the crash structure, and the outboard surface being substantially free of an indent at the lateral plane.

17. The crash structure of claim 16, wherein the first plurality of indents comprises a first indent that extends over an entire width of the first planar surface and a second indent extends over less than the entire width of the first planar surface.

18. A method of manufacturing a crash structure for a front of a vehicle, the crash structure being configured to extend in a longitudinal direction of the vehicle, the method comprising:
folding and joining one or more sheets of material to form a substantially constant polygonal cross-sectional shape, a longitudinal projection of which defines a plurality of surfaces;
forming a plurality of indents on at least one of the surfaces, the indents being spaced apart from one another in the longitudinal direction; and
forming a further indent on an inboard side of the crash structure within a lateral plane disposed orthogonal to a longitudinal axis of the crash structure to facilitate inward deformation of the crash structure, wherein within the lateral plane an opposite outboard side of the crash structure is a continuous surface not provided with a corresponding further indent.

19. The method of claim 18, wherein forming the plurality of indents comprises:
forming a first indent on the at least one surface; and
forming a second indent on the at least one surface, the second indent smaller in size than the first indent, the second indent being further from the front of the vehicle than the first indent such that the first and second indents encourage successive collapse of the crash structure during a collision event.

* * * * *